United States Patent
Zhang et al.

(10) Patent No.: US 11,584,688 B2
(45) Date of Patent: Feb. 21, 2023

(54) VISIBLE-LIGHT-PHOTOCATALYZED COMPOSITE LIGHT-TRANSMITTING CONCRETE AS WELL AS PREPARATION METHOD AND APPLICATION THEREOF

(71) Applicant: Chongqing University, Chongqing (CN)

(72) Inventors: Yuxin Zhang, Chongqing (CN); Xingjian Dai, Chongqing (CN); Yi Wang, Chongqing (CN); Kailin Li, Chongqing (CN); Xiaoying Liu, Chongqing (CN); Xuelei Zhang, Chongqing (CN); Li Feng, Chongqing (CN); Yifan Zhang, Chongqing (CN); Jinsong Rao, Chongqing (CN); Jizhou Duan, Chongqing (CN); Haiyan Li, Chongqing (CN); Zhihao Bao, Chongqing (CN); Yucheng Du, Chongqing (CN); Junshu Wu, Chongqing (CN); Yizhuang Wu, Chongqing (CN); Chenhao Zhao, Chongqing (CN); Jiayi Zhang, Chongqing (CN); Peng Yan, Chongqing (CN); Fan Dong, Chongqing (CN)

(73) Assignee: Chongqing University, Chongqing (CN)

( * ) Notice: Subject to any disclaimer, the term of this patent is extended or adjusted under 35 U.S.C. 154(b) by 0 days.

(21) Appl. No.: 17/653,873

(22) Filed: Mar. 8, 2022

(65) Prior Publication Data
US 2022/0306531 A1 Sep. 29, 2022

(30) Foreign Application Priority Data
Mar. 24, 2021 (CN) .......................... 202110330878.1

(51) Int. Cl.
*C04B 20/00* (2006.01)
*B01J 23/18* (2006.01)
(Continued)

(52) U.S. Cl.
CPC .......... *C04B 20/0068* (2013.01); *B01J 23/18* (2013.01); *B01J 31/34* (2013.01); *C04B 20/1051* (2013.01);
(Continued)

(58) Field of Classification Search
None
See application file for complete search history.

(56) References Cited

U.S. PATENT DOCUMENTS

2018/0008953 A1    1/2018   Jiang et al.

FOREIGN PATENT DOCUMENTS

| CN | 105854906 A | 8/2016 | |
|----|-------------|--------|--|
| CN | 107986693 A | 5/2018 | |
| CN | 110862251 A * | 3/2020 | ............. C04B 14/42 |

OTHER PUBLICATIONS

CN-110862251-A, english translation (Year: 2020).*
(Continued)

*Primary Examiner* — Stefanie J Cohen
(74) *Attorney, Agent, or Firm* — Bayramoglu Law Offices LLC

(57) ABSTRACT

A visible-light-photocatalyzed composite light-transmitting concrete contains several bundles of optical fibers, the optical fibers are coated with a protective layer on their outer surface, the protective layer contains a visible light photocatalyst, and the concrete has several gas-permeable pores. Such concrete is prepared by mixing a visible light photocatalyst and a light-transmitting glue, applying the mixture to the surface of optical fibers to form a protective layer, and using optical fibers in the concrete. The resulting concrete (Continued)

has dual properties of light transmittance and photocatalytic oxidation of gas-phase pollutants under visible light irradiation. The visible-light-photocatalyzed composite light-transmitting concrete significantly breaks through the limitation of photocatalytic concrete to light sources, so that gas-phase pollutants can be removed under visible light irradiation through photocatalysis of light-transmitting concrete. It also has good mechanical properties, decorativeness, and functional practicability due to coated optical fibers.

7 Claims, 8 Drawing Sheets

(51) Int. Cl.
*B01J 31/34* (2006.01)
*C04B 20/10* (2006.01)
*C03C 25/106* (2018.01)
*C04B 18/02* (2006.01)
*C04B 18/08* (2006.01)
*C04B 24/04* (2006.01)
*C04B 111/00* (2006.01)

(52) U.S. Cl.
CPC ......... *B01J 2531/54* (2013.01); *C03C 25/106* (2013.01); *C04B 18/021* (2013.01); *C04B 18/08* (2013.01); *C04B 24/04* (2013.01); *C04B 2111/00827* (2013.01)

(56) References Cited

OTHER PUBLICATIONS

Park et al., High-Performance Photocatalytic Cementitious Materials Containing Synthetic Fibers and Shrinkage-Reducing Admixture, Materials, 13, 1828 (Year: 2020).*

Dan-Jun et al., Synthesis of Diatomite/g-C3N4 Composite with Enhanced Visible-light-responsive Photocatalytic Activity, Journal of Inorganic Materials, vol. 31, No. 8 (Year: 2016).*

* cited by examiner

VISIBLE-LIGHT-PHOTOCATALYZED COMPOSITE LIGHT-TRANSMITTING CONCRETE AS WELL AS PREPARATION METHOD AND APPLICATION THEREOF

CROSS REFERENCE TO THE RELATED APPLICATIONS

This application is based upon and claims priority to Chinese Patent Application No. 202110330878.1, filed on Mar. 24, 2021, the entire contents of which are incorporated herein by reference.

TECHNICAL FIELD

The present invention belongs to the field of concrete, and in particular to a visible-light-photocatalyzed composite light-transmitting concrete as well as a preparation method and an application thereof.

BACKGROUND

With the rapid development of industry, the air pollution problem has become increasingly prominent. Nitrogen oxides (NOx) are a key factor in the formation of air pollution, and an important precursor of haze and photochemical smog. According to the statistics, air pollution kills more than 3 million people every year in the world, and it has become the most serious environmental pollution problem in the 21st century. In response to this problem, all sectors of society have begun to improve technology to achieve energy saving and emission reduction. As crucial basic raw materials for the national economy, building materials shoulder a great mission of providing material support for the construction of ecological civilization in addition to energy saving and emission reduction in their production processes. In this context, photocatalytic functional building materials have attracted extensive attention of domestic and overseas researchers due to their additional photolysis of pollutants.

At present, however, this technology is restricted by problems such as low solar energy utilization efficiency, low pollutant purification efficiency and unclear reaction mechanism of existing photocatalytic materials in practical applications. The photocatalytic performance of nano-$TiO_2$ requires excessively severe ultraviolet irradiation conditions, and a key point is the preparation of photocatalytic functional materials with the photocatalytic performance under visible light wavelengths.

Concrete is the artificial material most used by human beings currently. In the context of increasing resource consumption, modern concrete product development concepts have tended to focus on the functional design of concrete and require it to embark on the road of green development. Therefore, new building materials such as pervious concrete, fair-faced concrete and cellular concrete emerge as the times require. In addition to characteristics of traditional concrete, these materials have functional effects such as perviousness, decoration, sound insulation and thermal insulation. As a novel and high-end functional building material, light-transmitting concrete can clearly show outlines or shapes of objects, play the role of light-transmitting development, and give people a strong visual impact; its light transmittance can reduce the power consumption of lighting, save energy, and protect the environment, which has drawn considerable attention in the architectural engineering field. In addition, light-transmitting concrete used in conjunction with the design of lighting art can greatly increase the aesthetics of buildings, making dull and monotonous concrete structures light and lively, and has been applied in buildings such as exhibition halls and art galleries.

If light-transmitting concrete can be combined with photocatalytic functional building materials, this new type of concrete will have dual functions of photocatalysis and light transmittance, with a certainty of broad development prospects.

SUMMARY

The present invention is put forward in order to solve at least one of the above-mentioned problems.

The first aspect of the present invention provides a visible-light-photocatalyzed composite light-transmitting concrete, wherein the concrete contains several bundles of optical fibers passing through the concrete, the optical fibers are coated with a protective layer on their outer surface, the protective layer contains a visible light photocatalyst, and the concrete has several gas-permeable pores.

The gas-permeable pores are naturally formed by utilizing the macroporosity of natural or recycled coarse aggregate in a cement matrix. Furthermore, a photocatalytic material is supported in pores on the surface of recycled coarse aggregate, which additionally enlarge pores of light-transmitting photocatalytic concrete, allowing entry of external gas-phase pollutants. Internally, light transmittance of optical fibers increases the photocatalytic efficiency and improves the mechanical strength of the concrete.

Preferably, the optical fibers are arrayed in the concrete, and the protective layer is a mixture of light-transmitting glue and the visible light photocatalyst.

Preferably, the light-transmitting glue is selected from UV glue, i.e., shadowless glue.

Preferably, the concrete contains cement and the visible light photocatalyst dispersed in cement.

Preferably, the visible light photocatalyst is selected from diatomite-supported visible light photocatalysts;

wherein the diatomite-supported visible light photocatalyst is selected from one or more of a diatomite-supported g-$C_3N_4$ photocatalyst and a diatomite-supported bismuth-based compound photocatalyst;

wherein the diatomite-supported bismuth-based compound photocatalyst is selected from a diatomite-supported $Bi_2WO_6$-VO photocatalyst, a diatomite-supported $Bi_2WO_6$ photocatalyst, a diatomite-supported $Bi_2MoO_6$ photocatalyst, a diatomite-supported bismuth oxyhalide photocatalyst and a diatomite-supported bismuth oxide photocatalyst;

wherein the diatomite-supported bismuth oxyhalide photocatalyst is selected from one or more of a diatomite-supported BiOBr photocatalyst, a diatomite-supported BiOCl photocatalyst and a diatomite-supported $BiOCl_xBr_{1-x}$ photocatalyst, where x is more than or equal to 0 and less than or equal to 1.

Preferably, a method for preparing the diatomite-supported g-$C_3N_4$ photocatalyst includes the following steps:

(1) ultrasonically dispersing diatomite powder in an alcohol solution to obtain a diatomite suspension;

(2) adding melamine to the diatomite suspension of step (1), stirring the solution at 20-30° C. for 2-6 h, drying the resulting mixture at 60-80° C. for 4-8 h, and calcining the dried mixture in a muffle furnace at 500-600° C. for 2-6 h to obtain the diatomite-supported g-$C_3N_4$ photocatalyst.

A method for preparing the diatomite-supported bismuth-based compound photocatalyst comprises the following steps:
(1) dispersing diatomite powder in a mixed solution of water-soluble bismuth salt, ethylene glycol and water;
(2) adding water-soluble tungstate, water-soluble molybdate, water-soluble carbonate, water-soluble chloride salt and water-soluble bromine salt respectively to the solution of step (1), stirring the solution for 2 h, and conducting a hydrothermal reaction at 120-180° C. for 2-24 h;
(3) after the reaction of step (2), washing and drying the product to obtain the diatomite-supported bismuth-based compound photocatalyst respectively: diatomite-supported $Bi_2WO_6$ photocatalyst, diatomite-supported $Bi_2MoO_6$ photocatalyst, diatomite-supported BiOCl photocatalyst or diatomite-supported BiOBr photocatalyst;

A method for preparing the diatomite-supported $Bi_2WO_6$-VO photocatalyst includes the following steps:
adding $Bi(NO_3)_3 \cdot 5H_2O$ to ethylene glycol under stirring to form a solution A1;
meanwhile, dissolving $Na_2WO_4 \cdot 2H_2O$ in ethylene glycol under stirring to form a solution B1;
after solutions A1 and B1 become transparent and uniform, adding the solution B1 dropwise to the solution A1 under stirring, stirring the resulting solution at room temperature for 0.5 h, transferring it to a diatomite-filled and polytetrafluoroethylene (PTFE) liner, and keeping it at 160° C. for 6-24 h;
after the reaction is completed, naturally cooling the reactor to room temperature, collecting the product, and washing it with ethanol and deionized water several times to remove residual species; drying the precipitate at 60° C. overnight to obtain a sample with a high oxygen vacancy defect, i.e., diatomite-supported $Bi_2WO_6$; then, annealing diatomite-supported $Bi_2WO_6$ in an air atmosphere at 250-550° C. for 4 h to obtain a catalyst with a certain oxygen vacancy concentration, i.e., the diatomite-supported $Bi_2WO_6$-VO photocatalyst.

A method for preparing the diatomite-supported $BiOCl_xBr_{1-x}$ photocatalyst includes the following steps:
dissolving $Bi(NO_3)_3 \cdot 5H_2O$ in $HNO_3$ under stirring to obtain a transparent solution A2; dissolving KCl and KBr at a certain amount-of-substance ratio of x:1−x in deionized water, adding citric acid to obtain a solution B2; adding the solution B2 dropwise to the solution $A_2$ under stirring, adjusting the pH to 7.0 with $NH_3 \cdot H_2O$, continuing stirring, transferring the mixed solution to a diatomite-filled and PTFE-lined stainless steel hydrothermal reactor, and conducting a reaction at a constant temperature of 120° C. for 10 h, after the reaction is completed, naturally cooling the solution, removing the supernatant, washing and filtering the product, and drying it at 60° C. to obtain a final powder sample, i.e., the diatomite-supported $BiOCl_xBr_{1-x}$ photocatalyst, where x is more than or equal to 0 and less than or equal to 1.

A method for preparing the diatomite-supported bismuth oxide photocatalyst includes the following steps:
dissolving bismuth citrate in water and stirring the solution to obtain a solution A3; adding $Na_2CO_3$ to distilled water and dissolving it under stirring to obtain a solution B3; adding the solution B3 dropwise to the solution A3 to obtain a mixed solution through stirring; transferring the mixed solution to a diatomite-filled and PTFE-lined stainless steel hydrothermal reactor, keeping it at 160° C. for 18 h, after the reaction is completed, centrifuging and washing the product, and drying it at 60° C. to obtain a precursor; calcining the precursor at 300° C.-500° C. to obtain a final powder sample, i.e., the diatomite-supported $Bi_2O_3$ photocatalyst.

The diatomite-supported $Bi_2WO_6$-VO photocatalyst with a certain oxygen vacancy concentration has special performance: The existence of oxygen vacancies not only narrows the band gap of $Bi_2WO_6$ and enhances the absorption of visible light, but also acts as an electron trap to inhibit the recombination of electrons and holes. As a result, separation and transport efficiencies of carriers are significantly improved, and abundant electrons are provided to activate $O_2$ molecules, which greatly promotes the generation of active species participating in photocatalytic redox reactions. In short, the formation of oxygen vacancy defects is responsible for adjusting the band structure, modifying the surface chemical state, improving the carrier separation efficiency, expanding the visible light absorption range, and facilitating the activation of reactants. The principle of the foregoing is that oxygen vacancy defects in a crystal lattice can effectively prolong the service life of the crystal, because the presence of oxygen vacancies leads to the formation of defect states below the conduction band (CB), thereby enhancing the visible light irradiation of excited electrons of sub-bands.

The second aspect of the present invention provides a method for preparing the visible-light-photocatalyzed composite light-transmitting concrete, including the following steps:
(1) optical fiber coating: mixing and dispersing uniformly light-transmitting glue and visible light photocatalyst powder, applying the mixture to the outer surface of optical fibers, and solidifying it to form a protective layer, so as to obtain optical fibers coated with the protective layer on their outer surface;
(2) fabrication of concreting mold with fixed optical fibers: arranging optical fibers of step (1) at intervals and fixing them in a concreting mold;
(3) preparation of concrete: pouring a cement matrix into the concreting mold of step (2) to obtain the visible-light-photocatalyzed composite light-transmitting concrete through forming, curing and demolding.

Preferably, the cement matrix used in step (3) contains a visible light photocatalyst. More preferably, the visible light photocatalyst is selected from diatomite-supported visible light photocatalysts;
wherein the diatomite-supported visible light photocatalyst is selected from one or more of a diatomite-supported g-$C_3N_4$ photocatalyst and a diatomite-supported bismuth-based compound photocatalyst;
wherein the diatomite-supported bismuth-based compound photocatalyst is selected from a diatomite-supported $Bi_2WO_6$-VO photocatalyst, a diatomite-supported. $Bi_2WO_6$ photocatalyst, a diatomite-supported $Bi_2MoO_6$ photocatalyst, a diatomite-supported bismuth oxyhalide photocatalyst and a diatomite-supported bismuth oxide photocatalyst;
wherein the diatomite-supported bismuth oxyhalide photocatalyst is selected from one or more of a diatomite-supported BiOBr photocatalyst, a diatomite-supported BiOCl photocatalyst and a diatomite-supported $BiOCl_xBr_{1-x}$ photocatalyst, where x is more than or equal to 0 and less than or equal to 1.

The cement matrix of the present invention may adopt any existing suitable formulas.

Preferably, the cement matrix further contains cement, a polycarboxylate superplasticizer, water, fly ash and recycled coarse aggregate.

The optimal mixing ratios in the cement matrix are as follows: The water-glue ratio is 0.35, the glue-aggregate ratio is 3, the dose of fly ash is 5 wt %, and the replacement rate of recycled coarse aggregate is 50%.

The third aspect of the present invention provides an application of the visible-light-photocatalyzed composite light-transmitting concrete of the first aspect in catalytic decomposition of gas-phase pollutants under visible light irradiation with improved light transmittance.

Gas-phase pollutants can be formaldehyde, nitrogen oxides, VOCs, etc.

The above-mentioned technical solutions can be freely combined without contradiction.

The present invention has the following beneficial effects:

(1) The present invention first proposes a visible-light-photocatalyzed composite light-transmitting concrete by mixing a visible light photocatalyst and light-transmitting glue, applying the mixture to the surface of optical fibers to form a protective layer, and using optical fibers in concrete. The resulting concrete has dual properties of light transmittance and photocatalytic oxidation of gas-phase pollutants under visible light irradiation. The present invention significantly breaks through the limitation of photocatalytic concrete to light sources, so that gas-phase pollutants can be removed under visible light irradiation through photocatalysis of light-transmitting concrete, which is environment-friendly and pollution-free. The visible-light-photocatalyzed composite light-transmitting concrete has good mechanical properties, decorativeness, and functional practicability due to coated optical fibers.

(2) Optical fiber coating is intended to protect the surface of optical fibers from damage, improve the mechanical strength and reduce attenuation; when combined with concrete, it can improve light transmittance, and enhance mechanical properties of light-transmitting concrete to some extent. Further, a small amount of a visible light photocatalyst is added to light-transmitting glue applied to optical fibers, making a photocatalyst in light-transmitting glue easier to catalyze the rapid reaction of gas-phase pollutants under light irradiation. Furthermore, the photocatalytic reaction is improved due to the porosity of concrete and diatomite.

In a preferred technical solution, a cement matrix of the present invention contains a uniformly dispersed visible light photocatalyst that has a catalytic effect as long as it is exposed to light, which increases the catalytic efficiency of concrete.

(3) In a preferred technical solution, the present invention adopts a diatomite-supported visible light photocatalyst. Diatomite has favorable properties such as light weight, good porosity, large specific surface area, strong adsorption, excellent thermal stability, high melting point and corrosion resistance. Supporting a visible light photocatalyst material on diatomite can effectively improve the agglomeration of the catalyst material, increase the contact area between the photocatalyst and reactant molecules, and greatly improve the reaction rate for photocatalytic oxidation and removal of gas-phase pollutants.

Further, a multi-level pore passage structure of diatomite is used to reflect visible light multiple times in pore passages and confine visible light to multi-level pore passages, thereby increasing the visible light utilization efficiency of the diatomite-supported visible light photocatalyst, and ultimately improving the photocatalytic performance. Furthermore, the present invention increases the added value of diatomite products, expands new applications of diatomite in novel materials, functional materials, nanomaterials, etc., and improves both social benefits and economic benefits. In addition, diatomite and UV glue are mixed and applied to optical fibers, which can protect optical fibers while improving mechanical properties of optical fibers.

(4) The present invention combines physical degradation (diatomite method) and chemical degradation (photocatalysis method) of gas-phase pollutants to prepare a functional concrete material, which increases functional practicability of the concrete material, and meets requirements of green development and environmental protection.

(5) All materials used in the present invention are low-cost, easily available, recyclable, and toxic-free or harmless to the environment, which effectively overcomes various shortcomings in the prior art and achieves high industrial utilization value.

(6) The present invention has a variety of development prospects owing to the perfect combination of photocatalysis, light-transmitting concrete and photocatalytic concrete, and can provide reference for future development.

(7) As an inventive step of the present invention, considering the photocatalytic performance is limited due to the optical medium band gap (Eg=2.7 eV) of g-$C_3N_4$ and the high recombination rate of photogenerated electron-hole pairs, diatomite is introduced to make a diatomite@g-$C_3N_4$ composite adsorptive, and promote effective migration of photogenerated electrons and holes of g-$C_3N_4$ through interactions between g-$C_3N_4$ and diatomite, thereby enhancing the photocatalytic activity. In the present invention, a g-$C_3N_4$ photocatalyst nanomaterial is supported on porous diatomite as a carrier, which can effectively improve the agglomeration of the g-$C_3N_4$ nanomaterial, increase the contact area between the photocatalyst and reactant molecules, and greatly improve the reaction rate for photocatalytic oxidation and removal of gas-phase pollutants.

(8) Bismuth-based semiconductor nanomaterials are very prone to agglomerate, which affects the contact area between the reactant and the photocatalyst, and limits the reaction rate for photocatalytic oxidation and removal of gas-phase pollutants. In the present invention, a bismuth-based photocatalyst nanomaterial is supported on porous diatomite as a carrier, which can effectively improve the agglomeration of the bismuth-based nanomaterial, increase the contact area between the photocatalyst and reactant molecules, and greatly improve the reaction rate for photocatalytic oxidation and removal of gas-phase pollutants. Further, a multi-level pore passage structure of diatomite is used to reflect visible light multiple times in pore passages and confine visible light to multi-level pore passages, thereby increasing the visible light utilization efficiency of the diatomite@bismuth-based compound as a photocatalyst material, and ultimately improving the photocatalytic performance.

DETAILED DESCRIPTION OF THE EMBODIMENTS

Figure 1:
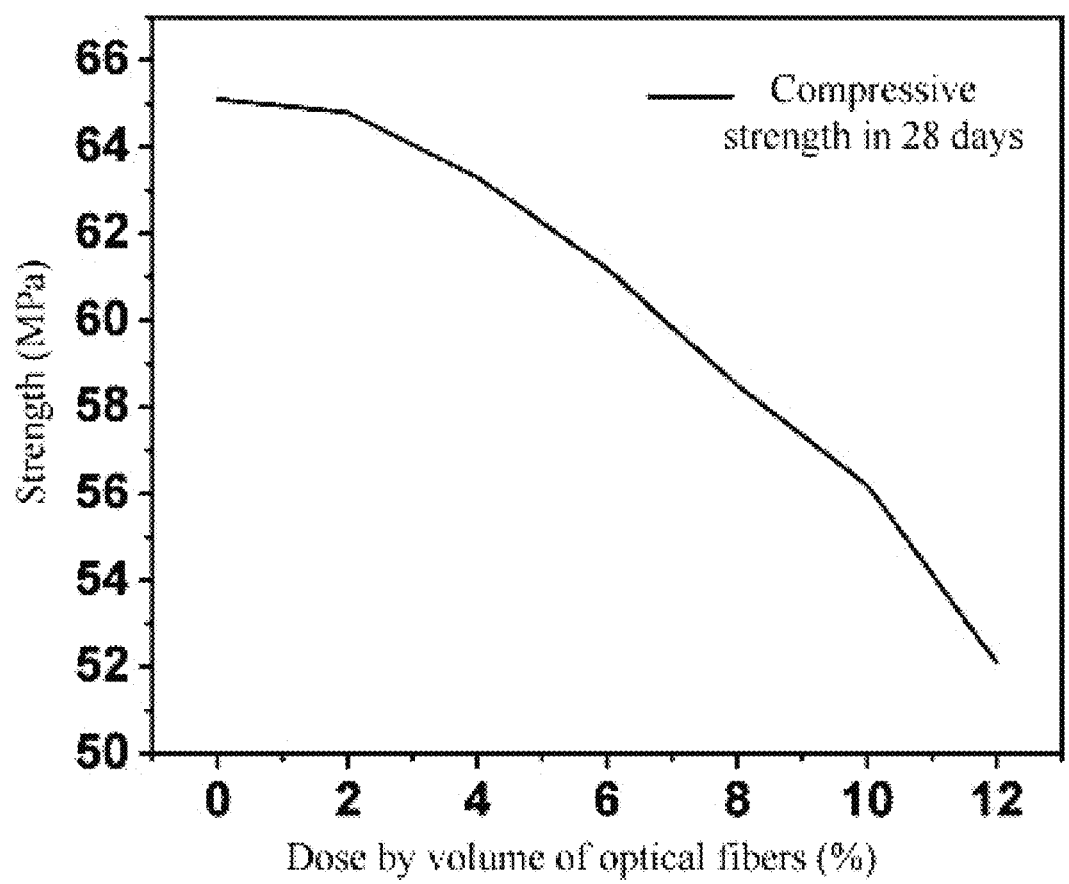
FIG. 1 shows the effect of the dose by volume of optical fibers on the compressive strength in application example 1.

The contents of the present invention will be further described below through specific embodiments.

Example 1

Example 1 provides a method for preparing a diatomite-supported g-$C_3N_4$ photocatalyst as follows:

1. Diatomite pretreatment: 1.0 g of diatomite was put in a plastic beaker. 20 ml of a 2.0 mol/L NaOH aqueous solution was added and mixed with diatomite under magnetic stirring. After a reaction at room temperature for 12 h, a sample was collected, washed to pH 7.0, dried at 80° C. overnight, and ground into diatomite powder.

2. Synthesis of diatomite-supported g-$C_3N_4$ photocatalyst (diatomite@g-$C_3N_4$):

First, 0.01 g, 0.02 g, 0.04 g, 0.10 g or 0.20 g of diatomite powder of step 1 was taken and dispersed in 30 mL of methanol with continuous ultrasonic waves at room temperature for 30 min to obtain a well-dispersed diatomite suspension. Next, 4.0 g of melamine was added to the diatomite suspension and stirred at 25 for 4 h. Then, through drying at 70° C. for 6 h, a dried mixture was calcined at 550° C. for 4 h in a muffle furnace to obtain a diatomite-supported g-$C_3N_4$ photocatalyst (diatomite@g-$C_3N_4$ photocatalyst). g-$C_3N_4$ was a product of reactive synthesis.

According to thermogravimetric (TG) analysis, when the dose of diatomite powder was 0.01 g, 0.02 g, 0.04 g, 0.10 g or 0.20 g, respectively, the content by weight of diatomite in the obtained diatomite@g-$C_3N_4$ photocatalyst was 1.22 wt %, 2.32 wt %, 5.46 wt %, 13.88 wt % or 25.21 wt %, respectively.

Example 2

A method for preparing optical fibers coated with a protective layer used in concrete is as follows:

A mixture of UV glue and the diatomite-supported g-$C_3N_4$ photocatalyst prepared in example 1 was applied to the surface of optical fibers to form a protective layer. The optical fibers (OF) had polymethyl methacrylate (PMMA) plastic filaments with a diameter of 1-2 mm.

Optical fiber coating was intended to protect the surface of optical fibers from damage, improve the mechanical strength and reduce attenuation; when combined with concrete, it could improve light transmittance and energy transfer performance, and enhance mechanical properties of light-transmitting concrete to some extent; in addition, a small amount of a diatomite@g-$C_3N_4$ photocatalyst was added to UV glue applied to optical fibers, which enabled a rapid reaction between optical fibers and a photocatalytic material, and the photocatalytic reaction was improved due to the porosity of concrete and diatomite.

The specific operations of optical fiber coating are as follows:

In this example, a coating fixture was used for coating operations, and the coating fixture was a commercially available optical fiber fixture, FH-40-LT900, for loose-tube optical fibers. This step can also be completed by any other method on the premise that the surface of optical fibers is uniformly coated with the mixture of UV glue and the diatomite-supported g-$C_3N_4$ photocatalyst, which is cured to form a protective layer on the surface of optical fibers.

(1) The coating fixture was cleaned:

Dust attached to the surface of a quartz plate needs to be removed, and dust-free paper dipped in alcohol can be used for this purpose. The quartz plate was gently wiped with dust-free paper dipped in alcohol. Residual alcohol evaporated or the quartz plate was wiped again with dry dust-free paper prior to the next step.

(2) A power supply was connected.

(3) A coating machine was powered on.

(4) Optical fibers were placed:
1. The upper cover of the coating fixture as well as upper covers of left and right fixtures were opened.
2. The coating fixture and optical fiber fixtures were ensured to be clean.
3. A vacuum adsorption control switch was turned on.
4. The position was aligned so that the required coating section of optical fibers was placed in a semicircular groove of the coating fixture, optical fibers were placed in a vacuum V-shaped groove, and the position of the required coating section of optical fibers was checked again.
5. The fixture on one side was closed, optical fibers were gently straightened to ensure they were under tension, and the fixture on the other side was closed. The optical fibers should always be in a straight line and all in the corresponding groove.
6. The coating fixture was gently closed, optical fibers were ensured to be in the optical fiber groove without displacement, and the adsorption key was turned off.

(5) UV glue and diatomite-supported g-$C_3N_4$ photocatalyst powder were mixed and dispersed uniformly, glue injection was started by pressing the glue injection control button, the direction of light-transmitting glue was observed from the upper transparent quartz plate the coating glue covered both sides of the required coating section of optical fibers, and glue injection was stopped by pressing the glue injection control button.

(6) Curing was conducted:
1. A UV lamp control button was pressed, and the UV lamp continued to light up for the set time and then went out; a curing key was "one-time" triggered to automatically complete the curing time without a long press.
2. 10 s later, the upper cover of the fixture was opened.
3. Both ends of the upper cover of the coating fixture were held with hands and gently opened upwards.
4. The coated optical fibers may stick to the upper or lower quartz plate. In this case, optical fibers and the quartz plate can be separated by holding both ends of optical fibers with hands and apply a little force.

5. The coated optical fibers should be observed for its quality, smoothness, and bubbles. If no bubbles are observed, optical fibers coated with the protective layer of the present invention will be obtained and used for the next step.

Example 3

Example 3 provides a visible-light-photocatalyzed composite light-transmitting concrete, wherein the concrete contains several bundles of optical fibers, the optical fibers are coated with a protective layer on their outer surface, the protective layer contains a visible light photocatalyst, the optical fibers are arrayed in the concrete, the protective layer is a mixture of light-transmitting glue and the visible light photocatalyst, and the concrete contains cement and the visible light photocatalyst dispersed in cement.

Raw materials: diatomite@g-$C_3N_4$ photocatalyst obtained in example 1, several bundles of optical fibers coated with the protective layer obtained in example 2, cement, a polycarboxylate superplasticizer, water, fly ash and recycled coarse aggregate. The optimal mixing ratios in the cement matrix were as follows: The water-glue ratio (referring to the ratio of water consumption per cubic meter of concrete to the dose of all cementing materials) was 0.35, the glue-aggregate ratio (referring to the weight ratio of powder (cement and fly ash) to aggregate (sand, referring to the sum of recycled coarse aggregate and natural coarse aggregate in this document) was 3, the dose of fly ash was 5%, and the replacement rate of recycled coarse aggregate was 50%.

The preparation process of recycled coarse aggregate was as follows: A suitable particle size was obtained through primary crushing, secondary crushing, impurity removal and screening. The basic properties of natural coarse aggregate and recycled coarse aggregate used for this test are shown in Table 1.

TABLE 1

Basic properties of natural coarse aggregate and recycled coarse aggregate

| | Apparent density ($kg/m^3$) | Bulk density ($kg/m^3$) | Water absorption (%) |
|---|---|---|---|
| Natural coarse aggregate | 2812 | 1450 | 0.41 |
| Recycled coarse aggregate | 1780.2 | 1123.3 | 6.32 |

In order to ensure that the matrix still has good integrity and high strength with a high dose of optical fibers, cement at a grade above 42.5 was used. The water-reducing rate of the polycarboxylate superplasticizer was more than 25%.

A method for preparing the visible-light-photocatalyzed composite light-transmitting concrete is as follows:

(1) Waste concrete was crushed and screened to obtain recycled coarse aggregate. The aggregate was soaked in a suspension with 0.6 wt % of the diatomite@g-$C_3N_4$ photocatalyst obtained in example 1 for 24 h, put in a 105° C. oven for 12 h to complete dryness, and cooled to room temperature to obtain recycled coarse aggregate supported with the diatomite@g-$C_3N_4$ photocatalyst, i.e., a photocatalytic recycled coarse aggregate component.

Natural coarse aggregate, 50% of mixing water and recycled coarse aggregate supported with the diatomite@g-$C_3N_4$ photocatalyst were weighed according to mixing ratios, added to a mixer and stirred for 30 s to make the surface of aggregate uniformly wet. Then, cement and fly ash were added to the mixer and stirred for 60 s, so that the surface of aggregate was effectively coated with cementing materials. Finally, the remaining water and superplasticizer were added to the mixer and stirred for 120 s to obtain a cement matrix.

(2) Fabrication of concreting mold with fixed light guide: The plastic plate was cut to make 1 bottom plate and 4 side plates with an internal clearance size of 120×120×120 mm. Layout lines were delineated on side plates with a specified spacing according to needs and shape requirements. A bit with a diameter of 1.0 mm was used to drill holes. The optical fibers obtained in example 2 were manually passed through holes layer by layer, knotted at a suitable length and fixed on the outside of side plates, so that they were arrayed in a concreting mold. In this step, the dose by volume of optical fibers was controlled to 2%, namely, the volume of optical fibers accounted for 2% of the total volume of concrete (i.e., the volume of the concreting mold).

(3) Preparation of visible-light-photocatalyzed composite light-transmitting concrete:

The cement matrix of step (1) was poured into the mold of step (2). In this process, the cement matrix was divided into three layers for tamping. Each layer was tamped 20-30 times. Tamping was conducted in a manner of spiral entry from all sides to the center. When a layer was tamped, about 20 mm of the next layer was tamped. After filled, the mold was placed on a vibrating table and vibrated for 5 s to make filled concrete compact. Then, the test piece was smoothed to obtain a concrete matrix.

(4) Curing of visible-light-photocatalyzed composite light-transmitting concrete:

The surface of the concrete matrix of step (3) was covered with a film for curing, and the film was removed after 1 d. Then, the test piece was cured in a standard curing room (with a temperature of (20±2)° C. and a humidity of >95%) for 28 days and demolded to obtain the visible-light-photocatalyzed composite light-transmitting concrete of the present invention. Optical fibers passed through the concrete, and both end faces of optical fibers were flush with end faces of the concrete.

Application Example 1

A series of a visible-light-photocatalyzed composite light-transmitting concrete only with different doses by volume of optical fibers was prepared by the method of example 3 to test the effect of the dose by volume of optical fibers on the compressive strength of concrete. As shown in FIG. 1, the abscissa is the dose by volume of optical fibers, i.e., the ratio of the volume of optical fibers to the total volume of concrete, and the ordinate is the compressive strength of concrete in 28 days.

According to FIG. 1, the compressive strength was about 65 MPa when the dose by volume of optical fibers was 0-2%, and gradually decreased to about 52 MPa when the dose by volume of optical fibers was 2-12%.

Application Example 2

Performance test of diatomite@g-$C_3N_4$ photocatalyzed light-transmitting concrete for catalyzing formaldehyde oxidation and removal under visible light irradiation:

Three types of a visible-light-photocatalyzed composite light-transmitting concrete only with different doses (0.2, 0.4% and 0.8%) of a diatomite@g-$C_3N_4$ photocatalyst were prepared by the method of example 3 to test the effect of the dose of g-$C_3N_4$ on the performance of concrete for formaldehyde removal. The dose of the diatomite@g-$C_3N_4$ photocatalyst was the mass content of the dose of the diatomite@g-$C_3N_4$ photocatalyst in the visible-light-photocatalyzed composite light-transmitting concrete. The photocatalyst was sourced from the protective layer of optical fibers and the cement matrix.

The test method is as follows: The above-mentioned three types of the visible-light-photocatalyzed composite light-transmitting concrete (120×120×120 mm) only with different doses of a diatomite@g-$C_3N_4$ photocatalyst were placed in a 1 $m^3$ sealed glass jar with an initial formaldehyde concentration of 1.05 mg/$m^3$ for visible light irradiation, so that the diatomite@g-$C_3N_4$ photocatalyst in concrete catalyzed a formaldehyde oxidation reaction for 48 h under visible light irradiation. The formaldehyde concentration in the sealed glass jar was tested and recorded every 12 h. The results are shown in FIG. 2 as a curve of the formaldehyde concentration varying with time.

Figure 2:
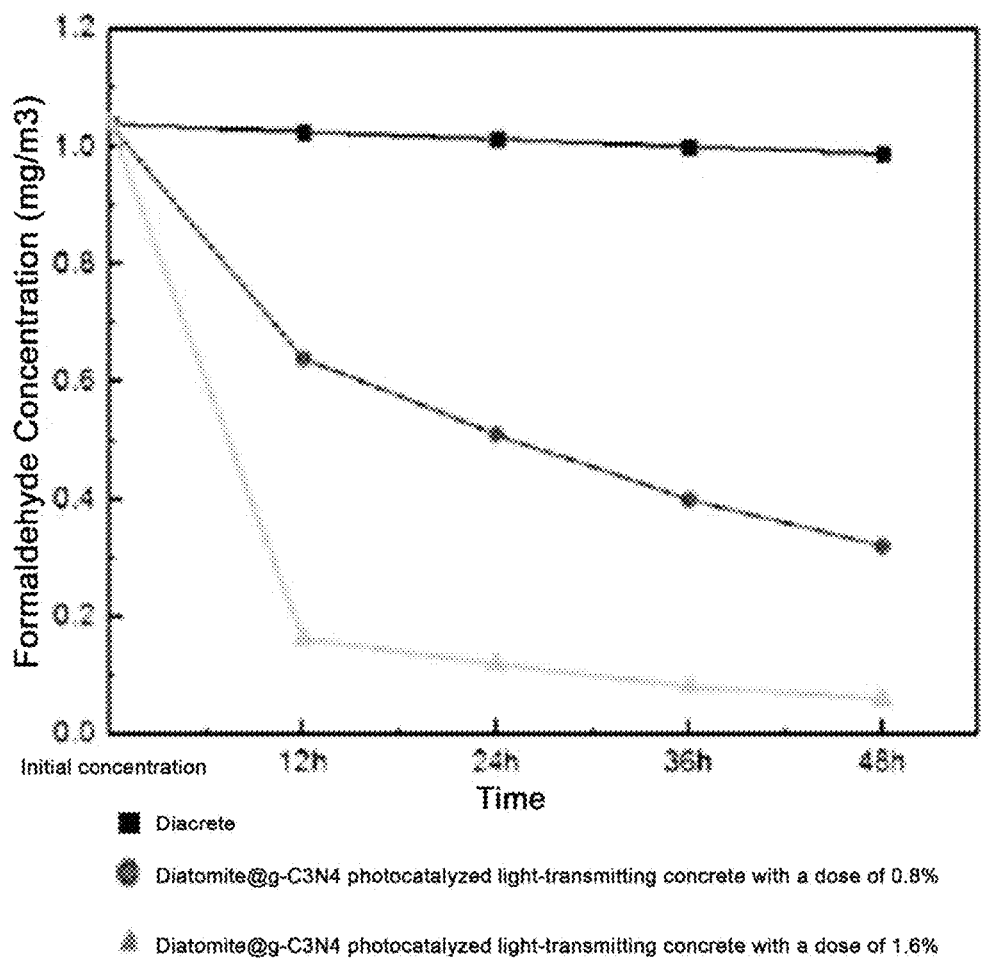
FIG. 2 is a curve of the formaldehyde concentration varying with time in application example 2.

According to FIG. 2:

(1) During the test period, the formaldehyde concentration in the sealed glass jar corresponding to concrete without diatomite@g-$C_3N_4$ merely decreased a bit and was still about 1 mg/$m^3$.

(2) During the test period, the formaldehyde concentration in the sealed glass jar corresponding to concrete with 0.8% of diatomite@g-$C_3N_4$ decreased significantly. It decreased rapidly to about 0.65 mg/$m^3$ at 12 h, and decreased to about 0.35 mg/$m^3$ at 48 h.

(3) During the test period, the formaldehyde concentration in the sealed glass jar corresponding to concrete with 1.6% of diatomite@g-$C_3N_4$ decreased the most. It decreased rapidly to about 0.15 mg/$m^3$ at 12 h, and decreased to about 0.05 mg/$m^3$ at 48 h. Therefore, in this application example, as long as 15 wt % of g-$C_3N_4$ was kept, most of formaldehyde can be oxidized and removed within 12 h.

Application Example 3

Performance test of diatomite@g-$C_3N_4$ photocatalyzed light-transmitting concrete for catalyzing NO oxidation and removal under visible light irradiation:

Three types of a visible-light-photocatalyzed composite light-transmitting concrete only with different doses (0.2, 0.4% and 0.8%) of a diatomite@g-$C_3N_4$ photocatalyst were prepared by the method of example 3 to test the effect of the dose of the diatomite@g-$C_3N_4$ photocatalyst (this dose was the mass content of the dose of the diatomite@g-$C_3N_4$ photocatalyst in the visible-light-photocatalyzed composite light-transmitting concrete, and the photocatalyst was sourced from the protective layer of optical fibers and the cement matrix) on the performance of concrete for NO removal.

Figure 9:
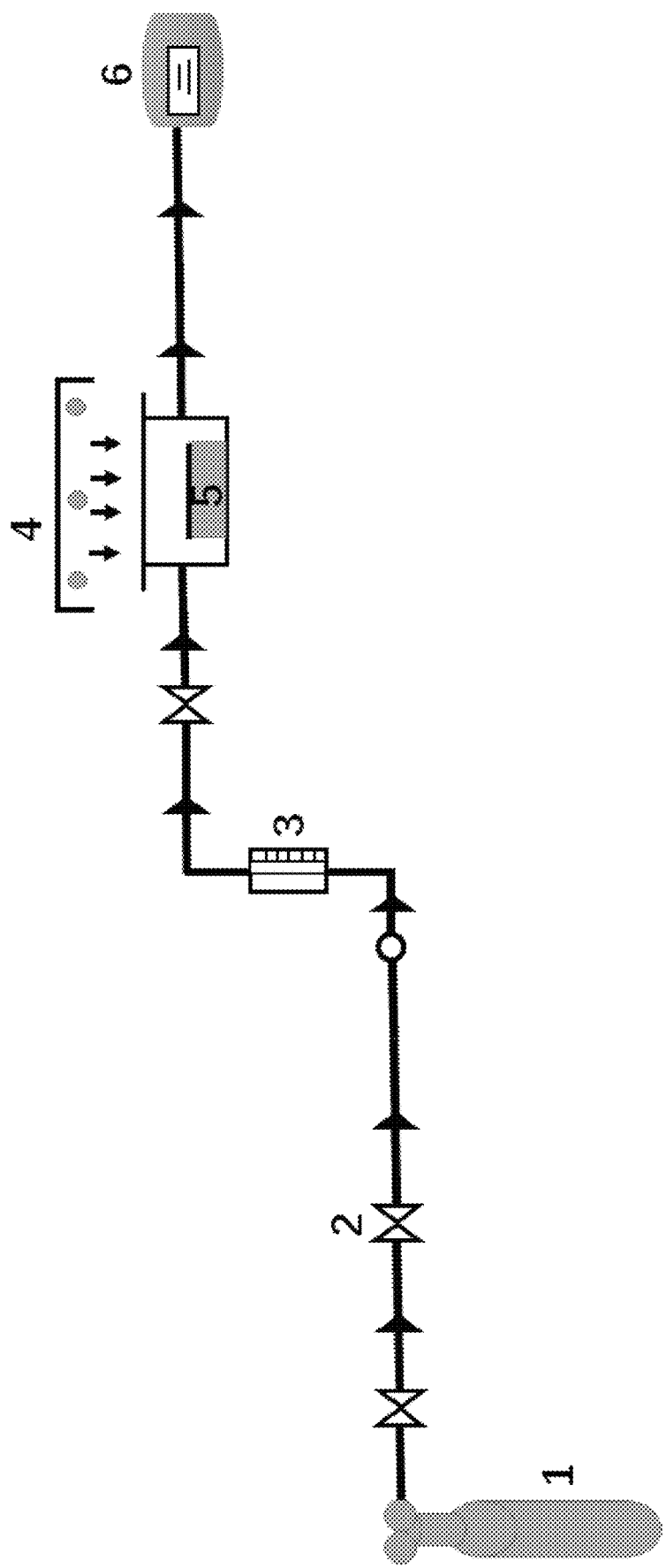
FIG. 9 is a test device for measuring the photocatalytic performance of a visible-light-photocatalyzed composite light-transmitting concrete in application example 3.

The test method is as follows:

The photocatalytic activity of a sample was verified by measuring the NO removal rate in a rectangular reactor (30×15×10 cm) at room temperature. According to the principle of photocatalysis, a designed test device was used to measure the photocatalytic performance of the visible-light-photocatalyzed composite light-transmitting concrete as shown in FIG. 9. In FIG. 9, 1—simulated exhaust source; 2—pressure valve; 3—glass rotameter; 4—photocatalytic reaction tank; 5—cement concrete specimen; 6—exhaust analyzer (model: 42c-TL). The core of the test device is a sealed gas reaction chamber that can accommodate a specimen with a size of 1.00×100×100 mm. For the test, cool daylight within a range of 420-650 nm were emitted with 3 8W daylight lamps to simulate visible light, with 3 prominent peaks at 460 nm, 560 nm and 600 nm. According to main components of automobile exhaust, NOx was selected as a main pollutant model for a photocatalytic degradation test, and a gas containing NO as a main component was selected to evaluate the photocatalytic degradation effect. The NO removal rate ($\eta$) was calculated according to the formula $\eta=(1 - C/C_0) \times 100\%$, where $C_0$ is the NO concentration of a feed stream and C is the NO concentration of outlet steam.

Figure 3:
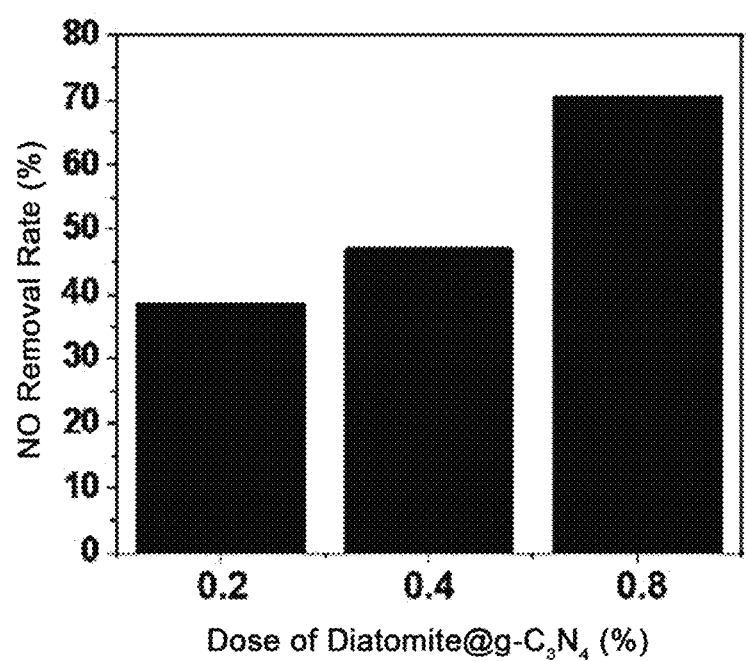
FIG. 3 shows NO degradation ratios corresponding to concrete with three different doses of a diatomite@g-$C_3N_4$ photocatalyst in application example 3.

According to FIG. 3:

(1) During the test period, the NO degradation ratio corresponding to concrete with 0.2% of the diatomite@g-$C_3N_4$ photocatalyst was about 38.6%, the NO degradation ratio corresponding to concrete with 0.4% of the diatomite@g-$C_3N_4$ photocatalyst was about 48.8%, and the NO degradation ratio corresponding to concrete with 0.8% of the diatomite@g-$C_3N_4$ photocatalyst was about 70.5%.

Therefore, in this application example, as the dose of the diatomite@g-$C_3N_4$ photocatalyst was increased, the NO degradation ratio increased. This strategy is expected to be extended to other g-$C_3N_4$-supported materials for potential applications in pollutant removal.

Example 4

Preparation of a diatomite@bismuth-based compound photocatalyst:

Purified diatomite, as a carrier for supporting a bismuth-based photocatalyst, was dispersed in a mixed solution of $Bi(NO_3)_3$, ethylene glycol and water, wherein proportions of ethylene glycol and water were adjustable. $Na_2WO_4$, $Na_2MoO_4$, $Na_2CO_3$, NaCl and NaBr solutions with different concentrations were added to the mixed solution to prepare different bismuth-based photocatalytic materials. The resulting solution was stirred with a magnetic stirrer for 2 h. Then, a hydrothermal reaction was conducted at 120-180° C. for 2-24 h. After the reaction, the product was washed with water and ethanol, and dried at 60° C. to obtain different diatomite@bismuth-based compound photocatalyst samples, including diatomite@$Bi_2WO_6$, diatomite@$Bi_2MoO_6$, diatomite@$Bi_2O_2CO_3$, diatomite@bismuth oxyhalide, etc.

The specific preparation conditions of the diatomite@bismuth-based compound photocatalyst are as follows:

1. Preparation of diatomite@$Bi_2WO_6$-VO photocatalyst:

2 mmol $Bi(NO_3)_3 \cdot 5H_2O$ was added to 20 mL of ethylene glycol under stirring to form a solution A. Meanwhile, 1 mmol $Na_2WO_4 \cdot 2H_2O$ was dissolved in 10 mL of ethylene glycol under stirring to form a solution B. After solutions A and B became transparent and uniform (about 2 h later), the solution B was added dropwise under stirring. The resulting solution was intensely magnetically stirred at room temperature for 0.5 h, transferred to a 50 mL PTFE-lined reactor filled with 45 mg of diatomite, and kept at 160° C. for 6, 12, 18 and 24 h; After the reaction is completed, the reactor was naturally cooled to room temperature. The product was collected, and washed with ethanol and deionized water several times to remove residual substances. The precipitate was dried at 60° C. overnight to obtain samples with high oxygen vacancy defects, i.e., diatomite-supported $Bi_2WO_6$-6, diatomite-supported $Bi_2WO_6$-12, diatomite-supported $Bi_2WO_6$-18, and diatomite-supported $Bi_2WO_6$-24, respectively. Diatomite-supported $Bi_2WO_6$-18 was annealed in an air-rich atmosphere at different temperatures (250° C., 350° C., 450° C. and 550° C.) for 4 h to obtain diatomite@$Bi_2WO_6$-VO catalysts with different oxygen vacancy concentrations respectively: diatomite-supported $Bi_2WO_6$-250, diatomite-supported $Bi_2WO_6$-350, diatomite-supported $Bi_2WO_6$-450, and diatomite-supported $WO_6$-550.

2. Simultaneous preparation of $Bi_2WO_6$-VO for comparison by the following method:

The preparation method was the same as that of diatomite-supported $Bi_2WO_6$-250, diatomite-supported $Bi_2WO_6$-350, diatomite-supported $Bi_2WO_6$-450, and diatomite-supported $Bi_2WO_6$-550, except that diatomite was not added.

3. Preparation of diatomite@$Bi_2WO_6$ photocatalyst:

4.85 g of Bi $(NO_3)_3$ and 1.65 g of $Na_2wo_4$ were weighed and dissolved in 35 ml of deionized water respectively. A $Na_2wo_4$ solution was slowly added dropwise to a $Bi(NO_3)_3$ solution under rapid stirring. After stirring was continued for 30 min, a white suspension was transferred to a 100 ml reactor filled with 60 mg of diatomite, and put in a 180° C. oven for a reaction for 24 h. After natural cooling, the product was repeatedly washed with deionized water and ethanol 5 times, and dried at 80° C. for 10 h to obtain the diatomite@$Bi_2WO_6$catalyst.

4. Simultaneous preparation of $Bi_2WO_6$ for comparison by the following method:

The preparation method was the same as that of diatomite@$Bi_2WO_6$, except that diatomite was not added.

5. Preparation of diatomite@BiOBr, diatomite@$BiOCl_xBr_{1-x}$-1:3, diatomite@$BiOCl_xBr_{1-x}$-1:1, diatomite@$BiOCl_xBr_{1-x}$-3:1, and diatomite@BiOCl photocatalysts:

0.01.5 mol $Bi(NO_3)_3 \cdot 5H_2O$ was weighed and dissolved in 40 mL of 2 mol·$L^{-1}$ $HNO_3$ under stirring to obtain a transparent solution A. A certain amount of KBr was dissolved in 30 mL of deionized water, and 1 g of citric acid was added to obtain a solution B. The solution B was added dropwise to the solution A under stirring. The pH was adjusted to 7.0 with $NH_3 \cdot H_2O$. Magnetic stirring was continued for 1 h. Then, the mixed solution was transferred to a PTFE-lined stainless steel hydrothermal reactor filled with 60 mg of diatomite. A reaction was conducted at a constant temperature of 120° C. for 10 h. After the reactor was naturally cooled upon the completion of the reaction, the supernatant was removed, washed with deionized water and absolute ethanol several times, filtered, and dried at 60° C. for 8 h to obtain a final powder sample.

The amount-of-substance ratios of KCl and KBr added to diatomite@BiOBr, diatomite@$BiOCl_xBr_{1-x}$-1:3, diatomite@$BiOCl_xBr_{1-x}$-1:1, diatomite@$BiOCl_xBr_{1-x}$-3:1 and diatomite@BiOCl photocatalysts were 0:1, 1:3, 1:1, 3:1, and 1:0, respectively.

Figure 4:
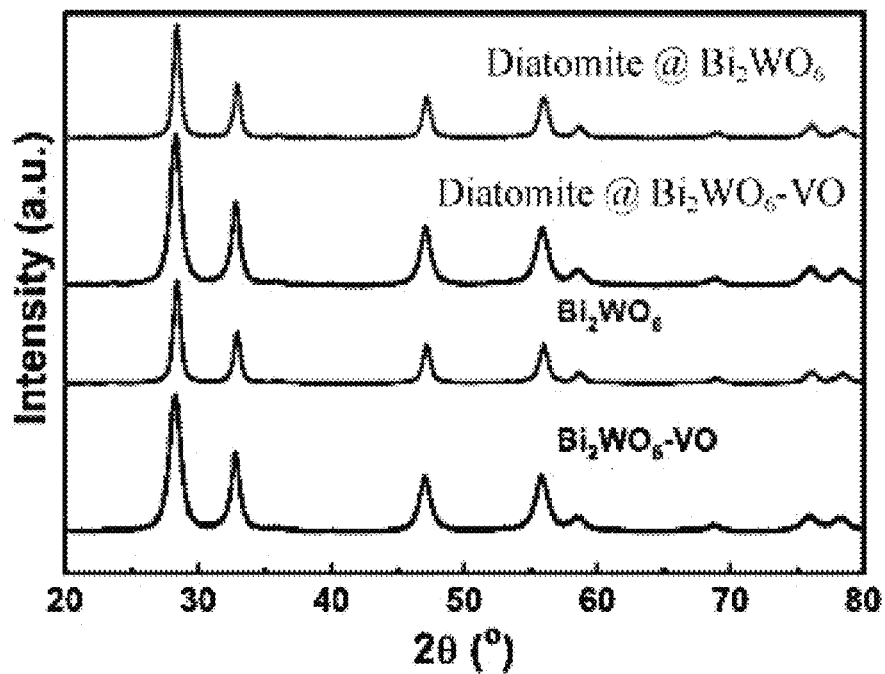
FIG. 4 is an XRD spectrum of diatomite@$Bi_2WO_6$-VO, $Bi_2WO_6$-VO, diatomite@$Bi_2WO_6$ and $Bi_2WO_6$ photocatalysts in example 4.

An XRD spectrum of diatomite@$Bi_2WO_6$-VO, $Bi_2WO_6$-VO, diatomite@$Bi_2WO_6$ and $Bi_2WO_6$ photocatalysts is given in FIG. 4. Specifically, diatomite@$Bi_2WO_6$-VO is diatomite-supported $Bi_2WO_6$-550, and $Bi_2WO_6$-VO is $Bi_2WO_6$-550.

Figure 5:
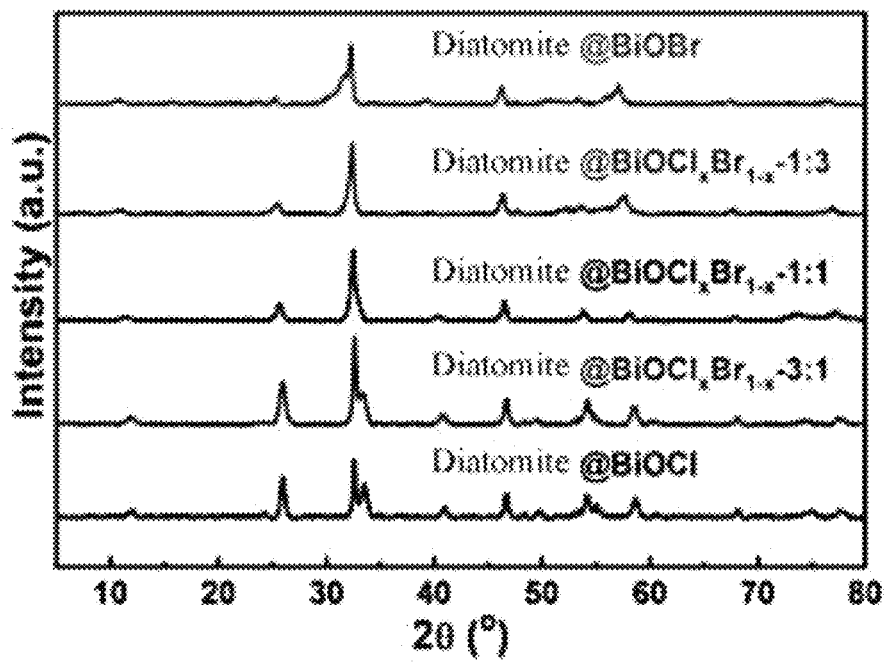
FIG. 5 is an XRD spectrum of diatomite@BiOBr, diatomite@$BiOCl_xBr_{1-x}$-1:3, diatomite@$BiOCl_xBr_{1-x}$-1:1, diatomite@$BiOCl_xBr_{1-x}$-3:1 and diatomite@BiOCl photocatalysts in example 4.

An XRD spectrum of diatomite@BiOBr, diatomite@$BiOCl_xBr_{1-x}$-1:3, diatomite@$BiOCl_xBr_{1-x}$-1:1, diatomite@$BiOCl_xBr_{1-x}$-3:1 and diatomite@BiOCl photocatalysts is given in FIG. 5.

According to FIGS. 4-5, bismuth-based compounds were successfully supported on diatomite.

Figure 6:
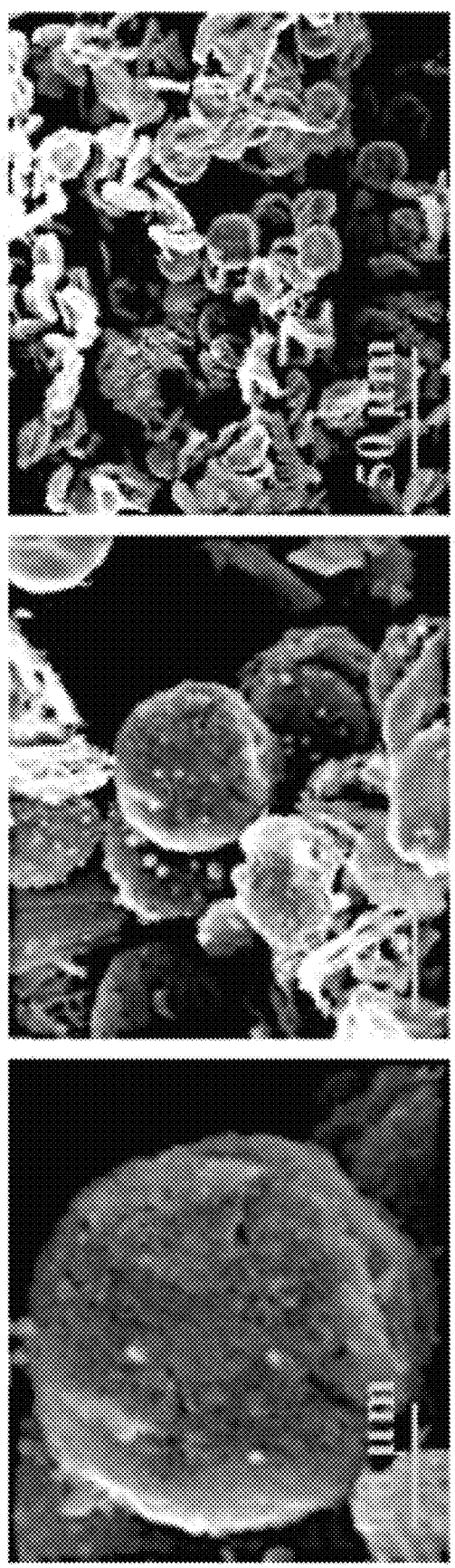
FIG. 6 is an SEM image of a diatomite@$Bi_2WO_6$ photocatalyst in example 4.

An SEM image of the diatomite@$Bi_2WO_6$photocatalyst is given in FIG. 6.

It can be seen from FIG. 6 as the SEM image of the diatomite@$Bi_2WO_6$photocatalyst that the prepared sample has a hierarchical bouquet-like structure with good dispersiveness. Compared with diatomite having a smooth surface, diatomite@$Bi_2WO_6$has a rougher outer surface with a crystalline structure that is more conducive to the attachment of pollutants and more beneficial to the separation of photogenerated electrons and holes on the surface of the catalyst.

Application Example 3

Performance and stability test of a diatomite@bismuth-based compound catalyst for NO oxidation and removal under visible light irradiation Test methods and conditions:

Diatomite@$Bi_2WO_6$, $Bi_2WO_6$, $Bi_2WO_6$-VO and diatomite@$Bi_2WO_6$-VO prepared in example 4 were used as four samples for the test. $Bi_2WO_6$ and $Bi_2WO_6$-VO were used for comparison. Specifically, diatomite@$Bi_2WO_6$-VO is diatomite-supported $Bi_2WO_6$-550, and $Bi_2WO_6$-VO is $Bi_2WO_6$-550.

The photocatalytic activity of a sample was verified by measuring the NO removal rate in a rectangular reactor (30×15×10 cm) at ambient temperature. A 150 W commercial tungsten halogen lamp with an ultraviolet cut-off filter (420 nm) for removing ultraviolet rays was placed vertically outside the reactor to detect the visible-light photocatalytic activity. The adsorption-desorption equilibrium was achieved after the lamp was turned on. For each test, a prepared sample (0.20 g) was dispersed with ethanol and spread onto two glass petri dishes with a diameter of 12.0 cm. The glass petri dishes with the sample were dried at 60° C. to remove ethanol from a suspension, cooled to room temperature and placed in the center of the reactor. NO gas was supplied from a compressed. NO gas cylinder at a concentration of 100 ppm (equilibrium state). Initial NO was diluted to about 550 ppb with a gas stream. The gas stream was well premixed with a three-way valve. Flow rates of NO and gas streams were set to 15 mL $min^{-1}$ and 2.4 L $min^{-1}$ respectively with a mass flow controller. The nitrogen oxide content was measured every 1 min with a nitrogen oxide analyzer (model: 42c-TL) to monitor the NO concentration. The NO removal rate (η) was calculated as follows: The NO removal rate (η) was calculated according to the formula η=(1C/$C_0$) 100%, where $C_0$ is the NO concentration of a feed stream and C is the NO concentration of outlet steam.

Figure 7:
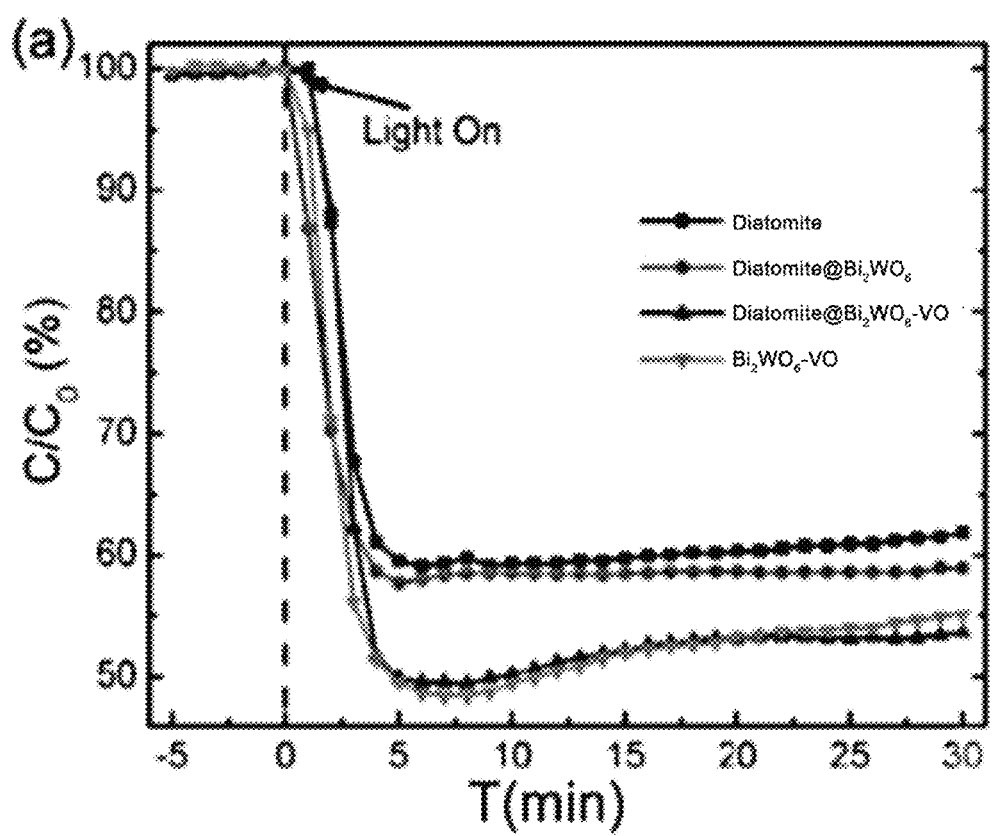
FIG. 7 is a NO removal curve of diatomite@$Bi_2WO_6$, $Bi_2WO_6$, $Bi_2WO_6$-VO and diatomite@$Bi_2WO_6$-VO in application example 3, with the abscissa as time and the ordinate as the NO removal rate ($C/C_0$%).

FIG. 7 is a NO removal curve of diatomite@$Bi_2WO_6$, $Bi_2WO_6$, $Bi_2WO_6$-VO and diatomite@$Bi_2WO_6$-VO, with the abscissa as time and the ordinate as the NO removal rate (C/$C_0$%).

According to FIG. 7, after the incorporation of photocatalytic materials, the NO content decreased rapidly with time, indicating that diatomite@$Bi_2WO_6$, $Bi_2WO_6$, $Bi_2WO_6$-VO and diatomite@$Bi_2WO_6$-VO have excellent photocatalytic activity. The degradation rate of pollutants increased rapidly in the early stage of light irradiation, and then increased at a lower speed with time. Through a comparison under the same dose and the same exposure time, the degradation efficiency of $Bi_2WO_6$with diatomite (diatomite@$Bi_2WO_6$) was significantly superior to that of $Bi_2WO_6$ without diatomite. This is because, on the one hand, diatomite improved the agglomeration of $Bi_2WO_6$, and on the other hand, the contact area with pollutants was increased, and thereby the degradation efficiency was improved. Due to oxygen vacancy defects, $Bi_2WO_6$-VO and diatomite@$Bi_2WO_6$-VO not only narrowed the band gap of $Bi_2WO_6$ and enhanced the absorption of visible light, but also acted as an electron trap to inhibit the recombination of electrons and holes. As a result, separation and transport efficiencies of carriers were significantly improved, and thereby the photocatalytic efficiency was improved. There was no significant difference in the photocatalytic efficiency between $Bi_2WO_6$-VO and diatomite@$Bi_2WO_6$-VO.

Figure 8:
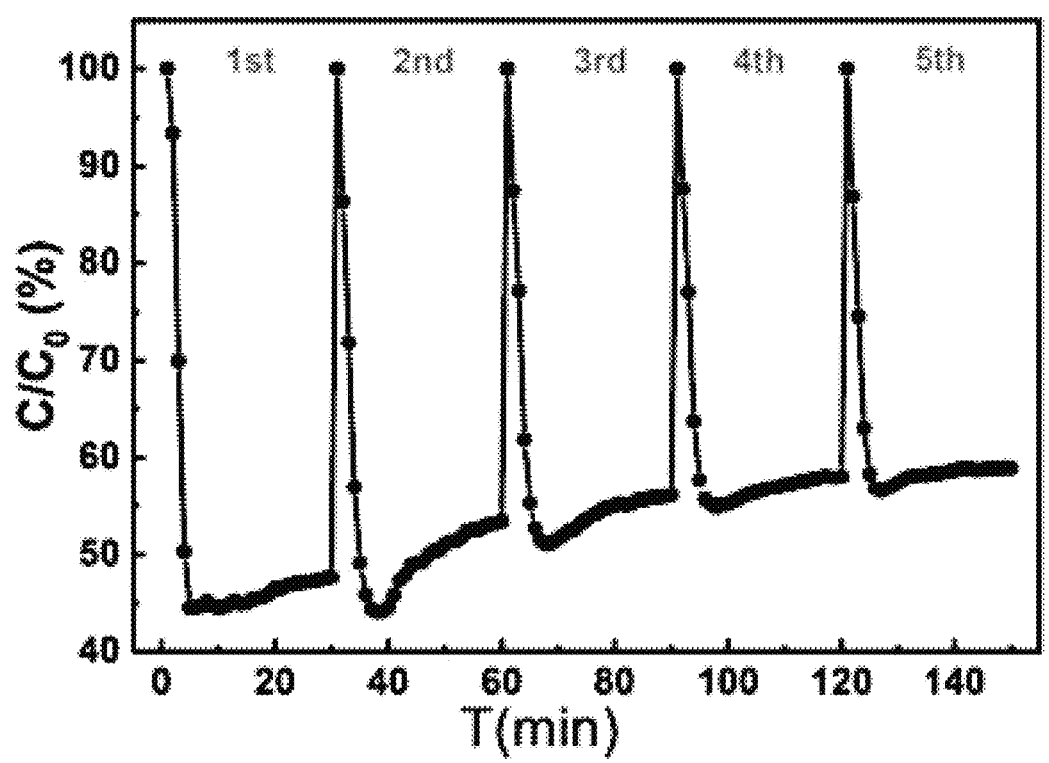
FIG. 8 shows the cyclic stability of NO removal with diatomite@$Bi_2WO_6$ under visible light ($\lambda \geq 420$ nm) irradiation in application example 3, with the abscissa as time and the ordinate as the NO removal rate.

FIG. 8 shows the cyclic stability of NO removal with diatomite@$Bi_2WO_6$ under visible light ($\lambda \geq 420$ nm) irradiation, with the abscissa as time and the ordinate as the NO removal rate.

According to FIG. 8, the photocatalytic efficiency was reduced due to the accumulation of photocatalytic NO oxidation products (nitrates) on the surface of the catalyst. Nitrates were removed through washing. The catalyst was dried after washed with water every time. The washed catalyst still maintained relatively long-lasting NO removal activity. After five cycles, diatomite@$Bi_2WO_6$ exhibited excellent stability and recyclability.

The foregoing are only specific embodiments of the present invention, but the protection scope of the present invention is not limited thereto. All changes or substitutions that can easily occur to those skilled in the art within the technical scope disclosed by the present invention should fall within the protection scope of the present invention. Therefore, the protection scope of the present invention should be subject to that of the claims.

What is claimed is:

1. A visible-light-photocatalyzed composite light-transmitting concrete, comprising a plurality of bundles of optical fibers passing through the visible-light-photocatalyzed composite light-transmitting concrete, wherein an outer surface of the optical fibers are coated with a protective layer comprising a visible light photocatalyst, and the visible-light-photocatalyzed composite light-transmitting concrete has a plurality of gas-permeable pores;

wherein the plurality of bundles of the optical fibers are arrayed in the visible-light-photocatalyzed composite light-transmitting concrete, and the protective layer is a mixture of a light-transmitting glue and the visible light photocatalyst;

the concrete comprises cement, wherein the visible light photocatalyst is dispersed in the cement;

the visible light photocatalyst is at least one diatomite-supported visible light photocatalyst selected from the group consisting of a diatomite-supported g-$C_3N_4$ photocatalyst and a diatomite-supported bismuth-based compound photocatalyst;

the diatomite-supported bismuth-based compound photocatalyst is at least one selected from the group consisting of a diatomite-supported $Bi_2WO_6$-VO photocatalyst, a diatomite-supported $Bi_2WO_6$ photocatalyst, a diatomite-supported $Bi_2MoO_6$ photocatalyst, a diatomite-supported bismuth oxyhalide photocatalyst, and a diatomite-supported bismuth oxide photocatalyst;

the diatomite-supported bismuth oxyhalide photocatalyst is at least one selected from the group consisting of a diatomite-supported BiOBr photocatalyst, a diatomite-supported BiOCl photocatalyst, and a diatomite-supported $BiOCl_xBr_{1-x}$ photocatalyst, wherein x is more than or equal to 0 and less than or equal to 1;

the diatomite-supported visible light photocatalyst is prepared as follows:

the diatomite-supported g-$C_3N_4$ photocatalyst is separately prepared by a method comprising the following steps:
1) ultrasonically dispersing a first amount of diatomite powder in an alcohol solution to obtain a diatomite suspension;
2) adding melamine to the diatomite suspension of step 1) to obtain a first reaction solution, stirring the first reaction solution at 20-30° C. for 2-6 h, drying a resulting mixture at 60-80° C. for 4-8 h to obtain a dried mixture, and calcining the dried mixture in a muffle furnace at 500-600° C. for 2-6 h to obtain the diatomite-supported g-$C_3N_4$ photocatalyst;

the diatomite-supported bismuth-based compound photocatalyst is separately prepared by a method comprising the following steps:
1) dispersing a second amount of the diatomite powder in a first mixed solution of a water-soluble bismuth salt, ethylene glycol, and water;
2) adding a water-soluble salt to the first mixed solution to obtain a second mixed solution, stirring the second mixed solution for 2 h, and conducting a first hydrothermal reaction at 120-180° C. for 2-24 h;
3) after the first hydrothermal reaction, washing and drying a product of the first hydrothermal reaction to obtain the diatomite-supported bismuth-based compound photocatalyst, wherein when the water-soluble salt is a water-soluble tungstate, a water-soluble molybdate, a water-soluble carbonate, a water-soluble chloride salt, or a water-soluble bromine salt, the diatomite-supported bismuth-based compound photocatalyst obtained is respectively the diatomite-supported $Bi_2WO_6$ photocatalyst, the diatomite-supported $Bi_2MoO_6$ photocatalyst, the diatomite-supported bismuth oxide photocatalyst, the diatomite-supported BiOCl photocatalyst, or the diatomite-supported BiOBr photocatalyst;

the diatomite-supported $Bi_2WO_6$-VO photocatalyst is separately prepared by a method comprising the following steps:

adding $Bi(NO_3)_3 \cdot 5H_2O$ to ethylene glycol under stirring to form a third mixed solution; meanwhile, dissolving $Na_2WO_4 \cdot 2H_2O$ in ethylene glycol under stirring to form a fourth mixed solution; then, adding the fourth mixed solution dropwise to the third mixed solution under stirring to obtain a resulting solution, stirring the resulting solution at room temperature for 0.5 h, transferring the resulting solution to a first diatomite-filled reactor, and keeping the first diatomite-filled reactor at 160° C. for 6-24 h to perform a first reaction;

after the first reaction is completed, naturally cooling the first diatomite-filled reactor to the room temperature, collecting and washing a solid precipitate, drying the solid precipitate at 60° C. overnight to obtain diatomite-supported $Bi_2WO_6$ with a high oxygen vacancy defect; then, annealing the diatomite-supported $Bi_2WO_6$ in an air atmosphere at 250-550° C. for 4 h to obtain the diatomite-supported $Bi_2WO_6$-VO photocatalyst with a predetermined oxygen vacancy concentration;

the diatomite-supported $BiOCl_xBr_{1-x}$ photocatalyst is separately prepared by a method comprising the following steps:

dissolving $Bi(NO_3)_3 \cdot 5H_2O$ in $HNO_3$ under stirring to obtain a first transparent solution; dissolving KCl and KBr at an amount-of-substance ratio of x: (1−x) in water, adding citric acid to obtain a second transparent solution, wherein x is more than or equal to 0 and less than or equal to 1;

adding the second transparent solution dropwise to the first transparent solution under stirring, adjusting a pH to 7.0, continuing stirring to obtain a fifth mixed solution, transferring the fifth mixed solution to a second diatomite-filled hydrothermal reactor to obtain a reaction mixture, conducting a second hydrothermal reaction with the reaction mixture at a constant temperature of 120° C. for 10 h, after the second hydrothermal reaction is completed, naturally cooling the reaction mixture, removing a supernatant from the reaction mixture, washing and filtering a product of the second hydrothermal reaction, and drying the product at 60° C. to obtain the diatomite-supported $BiOCl_xBr_{1-x}$ photocatalyst, wherein x is more than or equal to 0 and less than or equal to 1;

the diatomite-supported bismuth oxide photocatalyst is prepared by a method comprising the following steps: dissolving bismuth citrate in water and stirring to obtain a bismuth citrate solution; adding $Na_2CO_3$ to distilled water and dissolving $Na_2CO_3$ under stirring to obtain a $Na_2CO_3$ solution; adding the $Na_2CO_3$ solution dropwise to the bismuth citrate solution to obtain a sixth mixed solution under stirring; transferring the sixth mixed solution to a third diatomite-filled hydrothermal reactor, keeping the third diatomite-filled hydrothermal reactor at 160° C. for 18 h to perform a third hydrothermal reaction, after the third hydrothermal reaction is completed, centrifuging and washing a product of the third hydrothermal reaction, and drying the product at 60° C. to obtain a precursor; calcining the precursor at 300° C.-500° C. to obtain the diatomite-supported bismuth oxide photocatalyst.

2. A preparation method of the visible-light-photocatalyzed composite light-transmitting concrete of claim 1, comprising the following steps:
1) optical fiber coating, comprising: mixing and dispersing uniformly a light-transmitting glue and a powder of the visible light photocatalyst to obtain a mixture, applying the mixture to the outer surface of the optical fibers, and solidifying the mixture to form the protective layer, so as to obtain the optical fibers coated with the protective layer on the outer surface;
2) fabricating a concreting mold with the optical fibers fixed therein, comprising: arranging the optical fibers of step 1) at intervals and fixing the optical fibers in the concreting mold; and
3) preparing the visible-light-photocatalyzed composite light-transmitting concrete, comprising: pouring a cement matrix into the concreting mold of step 2) to obtain the visible-light-photocatalyzed composite light-transmitting concrete through forming, curing, and demolding.

3. The preparation method of claim 2, wherein the cement matrix comprises the visible light photocatalyst.

4. The preparation method of claim 3, wherein the cement matrix further comprises cement, a polycarboxylate superplasticizer, water, fly ash, and recycled coarse aggregate.

5. The preparation method of claim 2, wherein the visible light photocatalyst is at least one diatomite-supported visible light photocatalyst selected from the group consisting of a diatomite-supported g-$C_3N_4$ photocatalyst and a diatomite-supported bismuth-based compound photocatalyst;

the diatomite-supported bismuth-based compound photocatalyst is at least one selected from the group consisting of a diatomite-supported $Bi_2WO_6$-VO photocatalyst, a diatomite-supported $Bi_2WO_6$ photocatalyst, a diatomite-supported $Bi_2MoO_6$ photocatalyst, a diatomite-supported bismuth oxyhalide photocatalyst, and a diatomite-supported bismuth oxide photocatalyst;

the diatomite-supported bismuth oxyhalide photocatalyst is at least one selected from the group consisting of a diatomite-supported BiOBr photocatalyst, a diatomite-supported BiOCl photocatalyst, and a diatomite-supported $BiOCl_xBr_{1-x}$ photocatalyst, wherein x is more than or equal to 0 and less than or equal to 1.

6. The preparation method of claim 3, wherein the visible light photocatalyst is at least one diatomite-supported visible light photocatalyst selected from the group consisting of a diatomite-supported g-$C_3N_4$ photocatalyst and a diatomite-supported bismuth-based compound photocatalyst;

the diatomite-supported bismuth-based compound photocatalyst is at least one selected from the group consisting of a diatomite-supported $Bi_2WO_6$-VO photocatalyst, a diatomite-supported $Bi_2WO_6$ photocatalyst, a diatomite-supported $Bi_2MoO_6$ photocatalyst, a diatomite-supported bismuth oxyhalide photocatalyst, and a diatomite-supported bismuth oxide photocatalyst;

the diatomite-supported bismuth oxyhalide photocatalyst is at least one selected from the group consisting of a diatomite-supported BiOBr photocatalyst, a diatomite-supported BiOCl photocatalyst, and a diatomite-supported $BiOCl_xBr_{1-x}$ photocatalyst, wherein x is more than or equal to 0 and less than or equal to 1.

7. The preparation method of claim 4, wherein
the visible light photocatalyst is at least one diatomite-supported visible light photocatalyst selected from the group consisting of a diatomite-supported g-$C_3N_4$ photocatalyst and a diatomite-supported bismuth-based compound photocatalyst;

the diatomite-supported bismuth-based compound photocatalyst is at least one selected from the group consisting of a diatomite-supported $Bi_2WO_6$-VO photocatalyst, a diatomite-supported $Bi_2WO_6$ photocatalyst, a diatomite-supported $Bi_2MoO_6$ photocatalyst, a diatomite-supported bismuth oxyhalide photocatalyst, and a diatomite-supported bismuth oxide photocatalyst;

the diatomite-supported bismuth oxyhalide photocatalyst is at least one selected from the group consisting of a diatomite-supported BiOBr photocatalyst, a diatomite-supported BiOCl photocatalyst, and a diatomite-supported $BiOCl_xBr_{1-x}$ photocatalyst, wherein x is more than or equal to 0 and less than or equal to 1.

* * * * *